United States Patent [19]

Miller et al.

[11] Patent Number: 4,991,797
[45] Date of Patent: Feb. 12, 1991

[54] INFRARED SIGNATURE REDUCTION OF AERODYNAMIC SURFACES

[75] Inventors: Robert C. Miller, Encino; Rudolf J. Seemann, Santa Ana, both of Calif.

[73] Assignee: Northrop Corporation, Hawthorne, Calif.

[21] Appl. No.: 298,071

[22] Filed: Jan. 17, 1989

[51] Int. Cl.$^5$ .............................................. B64C 1/32
[52] U.S. Cl. ................................ 244/117 A; 244/1 R; 244/121; 165/41
[58] Field of Search ............... 244/117 A, 158 A, 121, 244/1 R; 62/315, 239, 316, 241; 165/41, 44, 104.26, 104.27; 89/36.01, 36.12; 239/127.3, 127.1; 250/342, 352

[56] References Cited

U.S. PATENT DOCUMENTS

| | | | |
|---|---|---|---|
| 2,468,820 | 5/1949 | Goddard | 62/315 |
| 2,908,455 | 10/1959 | Hoadley | 244/117 A |
| 2,941,759 | 6/1960 | Rice et al. | 244/117 A |
| 3,046,751 | 7/1962 | Gardner | 62/315 |
| 3,082,611 | 3/1963 | Alvis et al. | 62/239 |
| 3,103,885 | 9/1963 | McLauchlan | 244/117 A |
| 3,138,009 | 6/1964 | McCreight | 244/117 A |
| 3,395,035 | 7/1968 | Strauss | 244/117 A |
| 3,525,670 | 8/1970 | Brown | 165/104.26 |
| 3,793,861 | 2/1974 | Burkhard et al. | 244/117 A |
| 3,797,781 | 3/1974 | Hollis | 244/117 A |
| 4,495,988 | 1/1985 | Grossman | 62/315 |
| 4,609,034 | 9/1986 | Kosson et al. | 89/36.01 |
| 4,664,177 | 5/1987 | Edelstein | 165/104.26 |
| 4,739,952 | 4/1988 | Gilles | 244/117 A |
| 4,801,113 | 1/1989 | Englehardt | 244/121 |

Primary Examiner—Galen Barefoot
Attorney, Agent, or Firm—Terry J. Anderson; Robert B. Block

[57] ABSTRACT

The invention provides a system for selective reduction of infrared signature of a vehicle subjected to aerodynamic heating. Liquid coolant under pressure vaporizes in porous sections of the skin of the vehicle to transpiration-cool the skin. Adjacent downstream solid skin sections are film-cooled by the vapor introduced in the boundary layer. Coolant flow control is achieved by pressurizing the liquid coolant, by modulating flow control valves, and, optionally, by configuring the porous section to operate as a cavitating venturi, or combinations of these methods.

18 Claims, 3 Drawing Sheets

INFRARED SIGNATURE REDUCTION OF AERODYNAMIC SURFACES

FIELD OF THE INVENTION

This invention relates generally to the cooling of aerodynamically heated surfaces. More particularly the invention relates to surface cooling for infrared signature reduction using a combination of pressure and temperature induced phase change of a coolant from liquid to vapor in a transpiration cooled skin.

BACKGROUND OF THE INVENTION

Various transpiration and film cooling techniques have been used for reducing the deleterious effects of aerodynamic heating on high-speed aerospace vehicles. The primary emphasis has been the reduction in heating to prevent structural degradation of various surfaces on vehicles during operations such as reentry into the atmosphere or hypersonic atmospheric flight. Many prior art systems employ a gaseous coolant for simplicity in system design and control. These systems typically use a compressed inert gas such as nitrogen or helium stored on board the vehicle or air from the low-pressure compressor section of a jet engine powering the vehicle. The use of gaseous coolants does not take advantage of the latent heat of vaporization available through the use of phase change liquid or solid coolants. The limitation in cooling capacity of gaseous systems and the limits of storage capability for inert gas coolants makes the use of a phase change coolant desirable.

Liquid or solid phase change transpiration cooling systems have typically been designed in prior art systems to store the coolant at or near the surface which requires cooling. The coolant is vaporized by heat conduction from the surface to be cooled and the vapor is transpired through pores in the surface. Typically the pores in the surface have been sealed with a material which has been melted away by heating of the surface or is blown out by vapor pressure from the vaporized coolant. For use in the cooling of reentry vehicles and hypersonic flight vehicles, emphasis has been placed in the prior art on passive systems responding only to an increase of surface temperature beyond the vaporization point of the coolant. Sufficient coolant is therefore required for use during the entire period of potentially deleterious heating.

Typically, cooling systems for infrared signature reduction do not require continuous use. The temperatures of interest for reduction of infrared signature are usually well below the temperature for onset of any structural degradation. The use of a controllable system which is operable on command during critical mission segments when infrared signature reduction is required is therefore desirable. On board storage of the coolant may be remote from the surface to be cooled and the quantity of coolant may be based on an estimated time period for use independent of actual aerodynamic heating loads on the vehicle.

Prior art infrared signature reduction techniques included transmission of heat from the surface of a vehicle to interior structure or stored fuel through the use of fuel circulation or direct heat conduction techniques such as heat pipes. These techniques have only marginal utility due to the limited heat storage capability of such systems. In addition, the initial temperature gradient between the surface to be cooled and the structure or fuel storage decreases as heat is transported from the surface to the storage, thereby decreasing the heat transfer rate and reducing cooling capability.

The use of gaseous coolants in infrared signature reduction systems requires significant coolant flow rates due to the low heat capacity of gaseous coolants and low heat transfer coefficients characteristic of gas forced convection cooling. The concomitant plumbing size for satisfactory pressure losses to achieve the high flow rates is impractical for most surface cooling applications. A coolant system using a phase change to take advantage of the latent heat of vaporization offers approximately ten times the heat capacity of a system using only gas cooling. Therefore, a ten-fold savings in coolant weight may be obtained using a phase change system as compared to an open loop or sacrificial gaseous cooling system. Similarly, the weight of closed loop systems using only gaseous cooling and recirculating the coolant is prohibitive.

It is, therefore, desirable to have an efficient liquid-to-vapor phase change coolant system which is controllable to allow on command usage and accurate surface temperature control to provide an optimum infrared signature reduction system.

SUMMARY OF THE INVENTION

The present invention employs transpiration cooling in conjunction with a phase change of coolant from liquid to gas for optimum cooling of an aerodynamic surface. Storage is provided for a liquid coolant which may be pressurized or pumped through a manifold system and plenums to a plurality of porous wall sections which are arranged along the direction of the free stream air flow to form the skin of the aerodynamic surface. The liquid coolant provided to the porous wall sections by the manifold enters each porous wall section on the inside surface.

The porous wall section comprises an inner high-pressure loss portion and an outer low-pressure loss portion. The high-pressure loss portion is typically a screen or plate with multiple orifices creating a plane of area restriction in the flow. Pressurized coolant flowing from the manifold into the inner high-pressure loss portion of the porous wall is subjected to the combination of heat addition from the porous medium in the high-pressure loss portion and the low downstream static pressure present in the low-pressure loss portion.

A state change of the coolant from liquid to gas starts as the coolant passes through the plane of area restriction, but primarily occurs in the outer low pressure portion of the porous wall where forced convection transfers heat from the porous wall to the coolant. Wide variation in the downstream ambient pressure at the outer surface of the low-pressure loss portion will have insignificant effect on the coolant flow rate. The high-pressure loss portion of the porous wall section will act as a cavitating flow nozzle, thereby controlling coolant flow from the high-pressure plenum into the outer low-pressure loss portion and subsequently the surface of the skin.

Alternatively, the coolant pressure may be set to provide sonic flow velocity in the vapor phase present in the high-pressure loss portion by maintaining that portion in a vapor state. Coolant flow can be varied directly with upstream density, but will not vary with changes in downstream static pressure beyond the critical pressure ratio.

Water is the preferred coolant. The water should be free of minerals or other contaminants to which might precipitate in the porous wall structure and additives may be used to lower the freezing temperature where required. Alternate coolants may be used which are free of minerals or other substances that precipitate or deposit on the porous wall structure, obstructing flow and restricting heat transfer to the coolant.

The invention provides an infrared signature reduction capability which is operable on command and controllable for skin temperature fluctuation. The use of a liquid phase change coolant with high latent heat of vaporization allows simplified integration of the invention into an aerospace vehicle.

Heat is transferred to the porous wall surface by forced convection and radiation and is then distributed through the porous media by conduction. This heat is subsequently transferred from the porous media to the coolant by forced convection. Heat transmission into the aerodynamic surface is reduced by the transpired coolant entering the boundary layer. The coolant forms a low temperature barrier between the wall and the hot gas and may also remove surface heat by forced convection if radiation is the dominant heat source. Further, the addition of coolant through the surface energizes the boundary layer reducing viscous forces resulting in a reduction of aerodynamic drag.

DETAILED DESCRIPTION OF THE INVENTION

Figure 1:
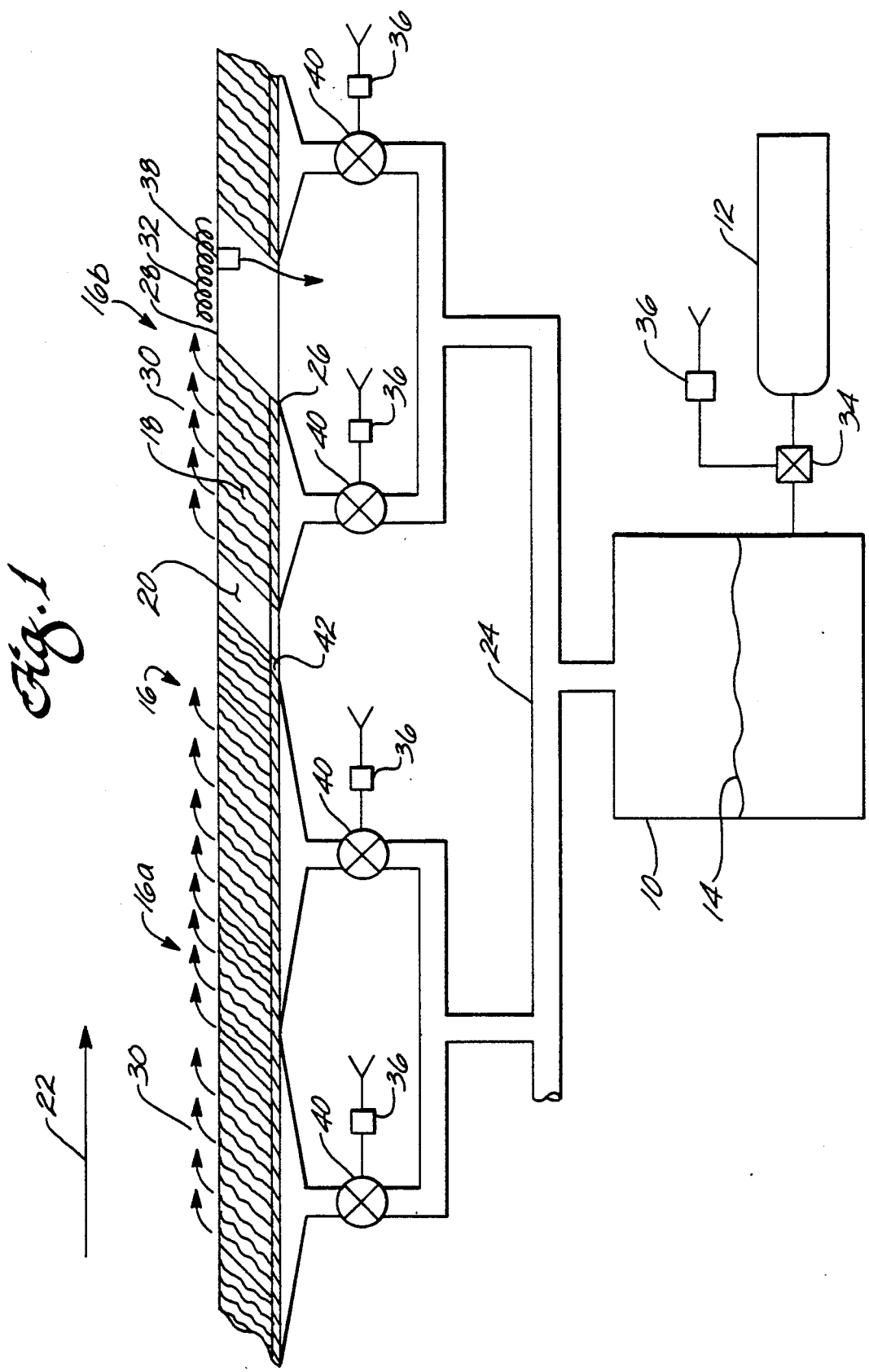
FIG. 1 is a schematic representation of the invention and its operation.

The present invention provides a liquid phase change coolant for vaporization within porous sections of the skin of an aerospace vehicle for temperature reduction and consequent infrared signature reduction. FIG. 1 shows an embodiment of the invention having a liquid storage tank 10. The liquid coolant in the storage tank is pressurized for expulsion. In the embodiment shown gas pressure is provided from a pressure vessel 12 into a first volume of the storage tank isolated by an elastomeric bladder 14. The liquid coolant is thereby pressurized within a second volume of the tank by the pressurized bladder.

Figure 3:
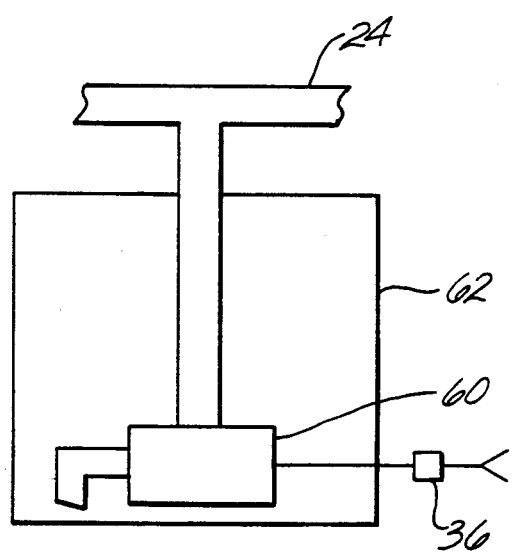
FIG. 3 is a partial schematic representation of a second embodiment of the pressurization system for the liquid coolant using a pump inside the storage tank.

An alternate embodiment using direct mechanical or fluidic pumping of the coolant for pressurization may be substituted and is shown in FIG. 3. A pump 60 in the storage tank 62 delivers pressurized coolant into the manifold 24 of FIG. 1 and to flow control valves 40.

A skin 16 having porous wall sections 18, arranged contiguously as in portion 16a or arranged with solid wall sections 20 alternating in a streamwise direction with respect to the free stream flow 22 as in portion 16b, forms the external surface of the vehicle. A manifold 24 carries the liquid coolant from the storage tank through manifold control valves to be explained in greater detail subsequently, to the inner surface 26 of the skin at the location of each of the porous wall sections.

Figure 2:
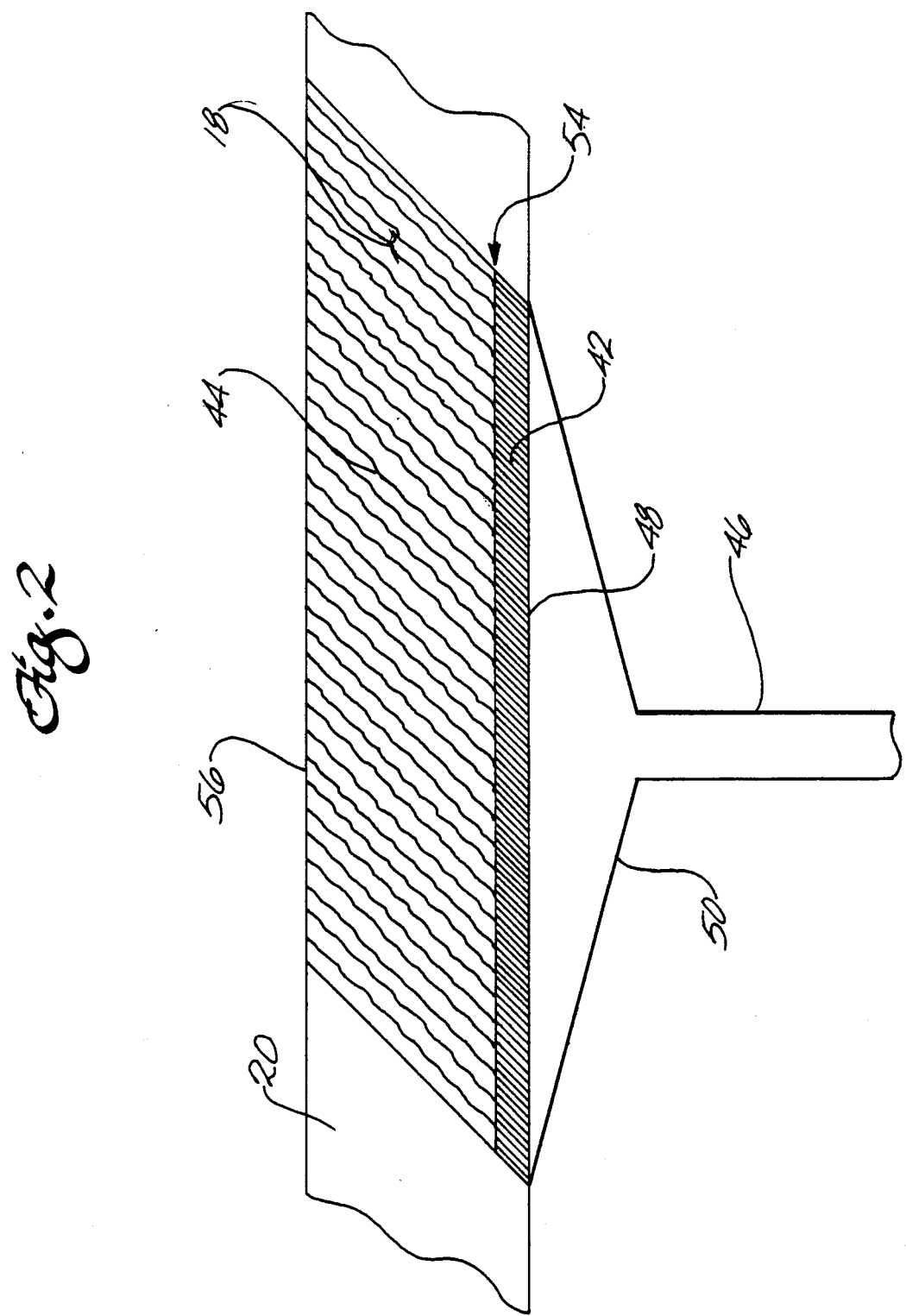
FIG. 2 is a detailed schematic representation of one porous wall section of the invention including an inner high-pressure loss portion and outer low-pressure loss portion.

A detailed schematic representation of a porous section of the skin is shown in FIG. 2. The porous wall section 18 has an inner high-pressure loss portion 42 and an outer low-pressure loss portion 44. Liquid coolant under pressure is provided from the coolant storage tank 10 through valves 40 of FIG. 1 to the manifold stub 46. Liquid coolant is maintained in contact with the inner surface 48 of the porous wall section 18 by a plenum 50 which expands from the manifold stub 46 to inner surface 48 of porous wall section 18. Coolant vaporization starts at the liquid vapor interface 54 where liquid coolant flashes to vapor as it enters the low pressure loss portion 44 and flows to the porous outer surface 56 where it is injected into the boundary layer.

Coolant flowing through the porous wall section is completely vaporized before reaching the porous outer surface 56 of the skin. The transpired vapor 30 exits through the aerodynamic surface of the skin, is entrained into the boundary layer flow and is swept downstream along the outer surface of the skin providing a film cooling region 32 on adjacent solid wall sections 20 as shown in FIG. 1. In addition to heat captured by the coolant during vaporization in the porous wall sections and film cooling of the solid wall sections, injection of the vapor into the boundary layer reduces the convective heat transfer from the high velocity free stream air flow. It should be noted that a synergistic benefit of reduced aerodynamic drag may be achieved by injection of the vapor into the boundary layer flow improving the aerodynamics of the aerospace vehicle.

Control of the liquid coolant flow rate is accomplished in this embodiment of the invention by variation of pressure on the bladder 14 or by varying the setting on valves 40, or a combination, to deliver different flow rates to different locations in the skin. A pressure regulator 34, valves 40 and the alternate pump 60 of FIG. 3 are actuated by temperature controllers 36 which are responsive to one or more temperature sensors 38 measuring the temperature of the outer surface of the skin. Control of individual sections of the skin in this manner may be desirable where aerodynamic heating is not uniform on the surface or infrared signature reduction is required for only certain portions of the skin.

Additional temperature uniformity on the skin may be achieved where varying levels of aerodynamic heating are present by varying spacing and size of the porous wall sections or altering their porosity.

Complete vaporization of the coolant in the invention, plus any sensible temperature rise above the vaporization temperature, is dependent on the following combination of parameters:

(a) Aerodynamic heating rate and wall outer surface temperature;
(b) Coolant flow rate and pressure loss through the porous wall;
(c) Void fraction of the porous wall;
(d) Pore size in the porous wall;
(e) Material thermal conductivity in the porous wall;
(f) Thickness of the porous wall;
(g) Heat transfer surface area; and
(h) Ambient static pressure.

The thickness of the porous wall is determined by the external heat flux concomitant with the required surface temperature, the thermal conductivity of the contiguous surface, the internal wetted surface area, the coolant flow rate and temperature, the coolant latent heat of vaporization, the forced convection heat transfer coefficient, and the coolant pressure loss from the high-pressure loss portion to the surface of the skin. An optimum configuration of the invention is achieved by an analysis that includes the foregoing degrees of freedom to satisfy a given surface temperature control requirement.

Outer skin temperature approaches coolant vaporization temperature as the skin-to-coolant overall heat transfer coefficient and area increase. Thermal equilibrium is reached when the heating rate equals the product of the coolant flow rate and the latent heat of the coolant. Resistance to heat flow is compensated by higher skin temperature until thermal equilibrium exists.

The porous wall sections may be homogeneous or may comprise more than one layer having differences in porosity, density or material. The material of construction for the porous wall sections may consist of reticulated metal or ceramic foam or other ligamented or joined structure that has a multiplicity of openings for the passage of vapor or liquid. Aluminum titanium, stainless steel, and various ceramics are commercially available in reticulated foam configurations that may be used in the present invention. The thickness of the skin is based on a combination of pore diameter, pore length, and permeability to achieve maximum heat transfer to the coolant passing through the reticulated foam.

The inner high-pressure loss portion of the porous wall section may comprise a high-pressure loss screen, a plate with multiple perforations, or other similar device. Design of the high-pressure loss screen for a given thickness and pressure ratio allows fluid flow control of the liquid and vapor coolant by either of two techniques. The high-pressure loss portion has reduced cross sectional flow area and may act as a cavitating flow nozzle or cavitating venturi, thereby maintaining a fixed flow rate through the high-pressure loss portion which is highly insensitive to downstream pressure changes. An alternate design of the high-pressure loss screen allows supply pressure of the liquid coolant to be set providing sonic velocity at the vapor phase interface 54, thereby providing choked flow in the vapor region which can be varied directly with upstream density but is insensitive to downstream static pressure.

Demineralized water is the preferred coolant due to its high latent heat of vaporization. Additives may be employed to modify coolant proportions, as required. Alternate liquid coolants may be used if the combination of latent heat of vaporization and vaporization temperature provide desired performance. Aircraft requiring skin temperature reduction for infrared signature control fly at speeds that normally preclude surface temperatures below 32° F. Therefore, it is unlikely that water will freeze if it is the selected coolant. The configuration of the invention is such that heating of the outer skin will conduct heat into the fluid plenums and liquify any ice that may have formed. Further, the fluid plenums and manifolds may be geometrically configured and constructed of materials to accept deformation imposed by freezing of the coolant in the system.

Typically, for a vehicle operating at approximately 30,000 feet, pressure altitude, water used as a coolant would vaporize at 155° F.; or 137° F. at 40,000 feet. Aerodynamic heating of the skin of a vehicle operating at Mach 1.8 sufficiently exceeds these temperatures allowing operation of the invention to reduce skin temperatures to that range. Transpiration cooled surfaces will approach coolant vaporization temperature if the product of coolant flow rate and latent heat capacity equal the heating rate. Skin emissivity control through application of suitable coatings further enhances the infrared signature reduction capability of the invention.

The invention will typically operate in an on-command basis because infrared reduction requirements may not be continuous and infrared temperatures of interest may be well below the onset of structural degradation. The system may also be used, however, to prevent structural degradation, as well as infrared signature reduction.

Operation of the invention can be described using FIG. 1. Cooling of the air vehicle surface is accomplished on command by pressurizing the coolant in the storage tank 10 with gas from the pressure vessel 12 through the regulator 34. The flow control valves 40 are opened to allow coolant flow through the manifold to the inner surface of the skin. Coolant is vaporized while passing through the porous wall section 18 and transpired into the boundary layer. Film cooling is accomplished on adjacent solid wall sections as the vaporized coolant is carried downstream by the air flow across the surface. Temperature of the surface is measured by temperature sensor 38 which in turn controls the pressure regulator 34 and valves 40 as required. One temperature sensor 38 may control several valves 40 or multiple sensors may be employed, each dedicated to a discreet unit, or various areas of the vehicle's surface. The flow control valves 40 and pressure regulators 36 may alternately be programmed and/or controlled from a source other than the temperature sensor 38 based on system calibrations for predetermined flight conditions.

In addition, if signature reduction is not required on certain sections of the vehicle, the flow control valves 40 for those sections may be closed thereby conserving coolant.

Having now described the invention in accordance with the requirements of the Patent Statutes, those skilled in the art will have no difficulty in making changes and modifications in the embodiments of the individual elements of the invention in order to meet specific requirements or conditions. The invention is equally applicable to use in cooling exhaust nozzle walls for infrared suppression. Such modifications and changes may be made without departing from the scope and spirit of the invention as set forth in the following claims.

We claim:

1. An apparatus for reducing the temperature of a surface subjected to heating comprising:
   a skin having porous wall sections and solid wall sections;
   said porous wall sections further comprise an inner high-pressure loss portion and an outer low-pressure loss portion;
   a means for storing a liquid coolant;
   a means for pressurizing the liquid coolant; and
   a manifold means for delivering the liquid coolant from the storage means to the porous wall sections whereby vaporization is induced in a pressure-temperature environment below the coolant vapor pressure line with liquid coolant passing through said inner portion being vaporized to make the latent heat of vaporization available for cooling said outer portion.

2. An apparatus as defined in claim 1 wherein the porous wall sections have an inner and outer surface and further have a thickness, porosity and pore length, such that liquid coolant introduced at the inner surface is vaporized by heat transfer from the porous wall section before exiting the outer surface.

3. An apparatus as defined in claim 1 further comprising a control means connected to said pressurizing means for regulating pressure of the liquid coolant, thereby regulating flow of the liquid coolant through such porous wall sections for complete vaporization.

4. An apparatus as defined in claim 3 further comprising a second control means interconnected to the pressurizing means, the second control means preprogrammed for activation and setting of the pressurizing means.

5. An apparatus as defined in claim 1 wherein the inner high-pressure loss portion is a high-pressure loss screen.

6. An apparatus as defined in claim 1 wherein the inner high-pressure loss portion is a plate having multiple perforations.

7. An apparatus as defined in claim 1 wherein the inner high pressure loss portion comprises a ceramic filter.

8. An apparatus as defined in claim 1 wherein the outer low-pressure loss portion comprises a reticulated foam.

9. An apparatus as defined in claim 1 wherein the reticulated foam is composed of at least one of the following materials: aluminum, titanium, stainless steel, and ceramic.

10. An apparatus as defined in claim 2 wherein the porous wall section comprises a porous contiguous ligamented structure having a multiplicity of passages defined therein having varying porosity for transmitting liquid or vapor coolant.

11. An apparatus as defined in claim 2 wherein the porous wall section comprises a contiguous structure having interconnecting void portions forming a multiplicity of passages of varying porosity for transmitting liquid or vapor coolant.

12. An apparatus as defined in claim 1 wherein the means for pressurizing the liquid coolant is a pump.

13. An apparatus for reducing the external temperature of a body subjected to aerodynamic heating comprising:
a skin having streamwise alternating porous wall sections and solid wall sections, the porous wall sections including an inner portion comprising a high-pressure loss screen and an outer portion of reticulated foam;
a storage tank for liquid coolant having a first volume for storage of the coolant, a second volume for pressurizing gas, and an elastomeric bladder separating the first volume and second volume;
a high-pressure gas source connected to the second volume of the storage tank;
a temperature controlled pressure regulator intermediate the high-pressure gas source and second volume for controlling gas pressure to the second volume;
a temperature sensor connected to the pressure regulator for sensing the temperature of the skin; and
a means for optionally deactivating the apparatus for use only on command.

14. A method for reducing the infrared signature of a body subjected to aerodynamic heating comprising the steps of providing a skin to said body having at least certain porous wall sections including an inner, high pressure loss portion and an outer low pressure loss portion, storing a liquid coolant, applying the coolant to the inner wall portion whereby vaporization is induced in a pressure-temperature environment below the coolant vapor pressure line with liquid coolant passing through said inner portion being vaporized to make the latent heat of vaporization available for cooling said outer portion, resulting in transpiration cooling the porous sections, film cooling adjacent solid sections and selectively providing coolant to particular desired porous wall sections for cooling of specific portions of the body.

15. A method for reducing the infrared signature of a body subjected to aerodynamic heating comprising the steps of providing a pressurized liquid coolant, sensing the temperature of the body, controlling flow of the coolant in response to the sensed temperature, vaporizing the coolant in a high-pressure loss portion of porous wall sections of the skin of the body, passing the vapor through a low-pressure loss portion of the porous wall sections to absorb additional heat, thereby transpiration cooling the porous skin sections and film cooling adjacent downstream solid wall sections of the skin of the body, and selectively providing coolant to desired porous wall sections for cooling of specific portions of the body.

16. Apparatus for reducing the infrared signature of the skin of a body subjected to aerodynamic heating comprising
means forming inner and outer porous layers over portions of said skin,
said inner layer being constructed relative to the outer layer such that the majority of the pressure drop occurs at the inner layer from a liquid being passed from the inside and through said layer,
a liquid coolant,
means for storing said liquid coolant under pressure and for providing said liquid to said inner layer, and
means for selectively providing coolant to desired porous wall sections for cooling of specific portions of the body,
whereby vaporization is induced in a pressure-temperature environment below the coolant vapor pressure line with liquid coolant passing through said inner portion being vaporized to make the latent heat of vaporization available for cooling said outer portion.

17. Method for reducing the infrared signature the outer surfaces of a vehicle subject to atmospheric heating, comprising,
forming at least portions of the skin with an outer layer of reticulated and ligamented, porous, thermally conductive material coupled with an inner layer of porous material, said outer layer serving to efficiently conduct heat from the outer surface into its entire volume,
providing a source of a liquid under pressure for delivery to the inner layer, said liquid having a substantial heat of vaporization,
forming said inner layer relative to the outer layer such that the majority of the pressure drop occurs at the inner layer for a liquid being passed through said layers so that said liquid vaporizes on passing through said inner layer to make the latent heat of vaporization available for cooling said outer layer, and
connecting said source of liquid to the inner layer under vehicle command so that liquid pressure drops across inner layer causes liquid to change phase and to vaporize, and then to pass through and downstream from outer layer, withdrawing heat from the entire volume of the outer layer and downstream skin.

18. An apparatus for reducing the temperature of a surface subjected to heating comprising:
   a skin having porous wall sections and solid wall sections;
   said porous wall sections comprising an inner high-pressure loss portion and an outer low-pressure loss portion;
   means for storing a liquid coolant;
   means for pressurizing the liquid coolant;
   manifold means for delivering the liquid coolant from the storage means to the inner high-pressure loss portion porous wall sections whereby vaporization is induced in a pressure-temperature environment below the coolant vapor pressure line with liquid coolant passing through said inner portion being vaporized to make the latent heat of vaporization available for cooling said outer portion; and
   valve means incorporated in the manifold means for reducing or eliminating liquid coolant flow to selected portions of the manifold means.

* * * * *